United States Patent
Reinehr et al.

(10) Patent No.: US 6,830,715 B1
(45) Date of Patent: Dec. 14, 2004

(54) METHOD AND DEVICE FOR PRODUCING ELASTANE THREADS FROM RECYCLING MATERIAL

(75) Inventors: Ulrich Reinehr, Dormagen (DE); Tilo Sehm, Düsseldorf (DE); Wolfgang Anderheggen, Dormagen (DE); Toni Herbertz, Dormagen (DE); Helmut Judat, Langenfeld (DE)

(73) Assignees: Bayer Faser GmbH, Dormagen (DE); Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/913,947

(22) PCT Filed: Feb. 14, 2000

(86) PCT No.: PCT/EP00/01206

§ 371 (c)(1),
(2), (4) Date: Aug. 20, 2001

(87) PCT Pub. No.: WO00/50673

PCT Pub. Date: Aug. 31, 2000

(30) Foreign Application Priority Data

Feb. 24, 1999 (DE) .......................... 199 07 830

(51) Int. Cl.[7] .................... D01D 1/10; D01D 5/04; D01D 5/06; D01F 6/70; D01F 13/04
(52) U.S. Cl. .................... 264/37.28; 264/102; 264/140; 264/169; 264/184; 264/205; 264/211; 366/98; 366/336; 425/192 S; 425/198; 425/464
(58) Field of Search .............................. 264/37.28, 102, 264/140, 169, 184, 205, 211; 425/192 S, 198, 464; 366/98, 336; 428/364

(56) References Cited

U.S. PATENT DOCUMENTS 5,741,867 A    4/1998  Reinehr et al. ............. 525/453
5,961,908 A  * 10/1999 Reinehr et al. ............. 264/169

FOREIGN PATENT DOCUMENTS

| CA | 771 086 A | 11/1967 |
| DE | 4 222 772 A1 | 1/1994 |
| DE | 4 327 805 A1 | 2/1994 |
| DE | 4 446 339 C1 | 5/1996 |
| DE | 19504316 C1 * | 8/1996 |
| EP | 0 317 273 A2 | 5/1989 |

OTHER PUBLICATIONS

Abstract of JP 55012128 (Jan. 28, 1980).
F. Fourné, Bonn: Elastan–Garne: Herstellung, Eigenschaften, Einsatzgebiete, Chemiefasern/ Textilindustrie, 44./96. Jahrgang, Jun. 1994, p. 392.
Patent Abstracts of Japan, Publication No. 55012128, Toyo Prod KK (Jan. 28, 1980).
Derwent Abstract (Accession# 17495C) of JP 55012128A dated Jan. 28, 1980.

* cited by examiner

*Primary Examiner*—Leo B. Tentoni
(74) *Attorney, Agent, or Firm*—Norris McLaughlin & Marcus

(57) ABSTRACT

Method and device for producing elastane threads from spinning solutions using recycled elastane material.

32 Claims, 3 Drawing Sheets

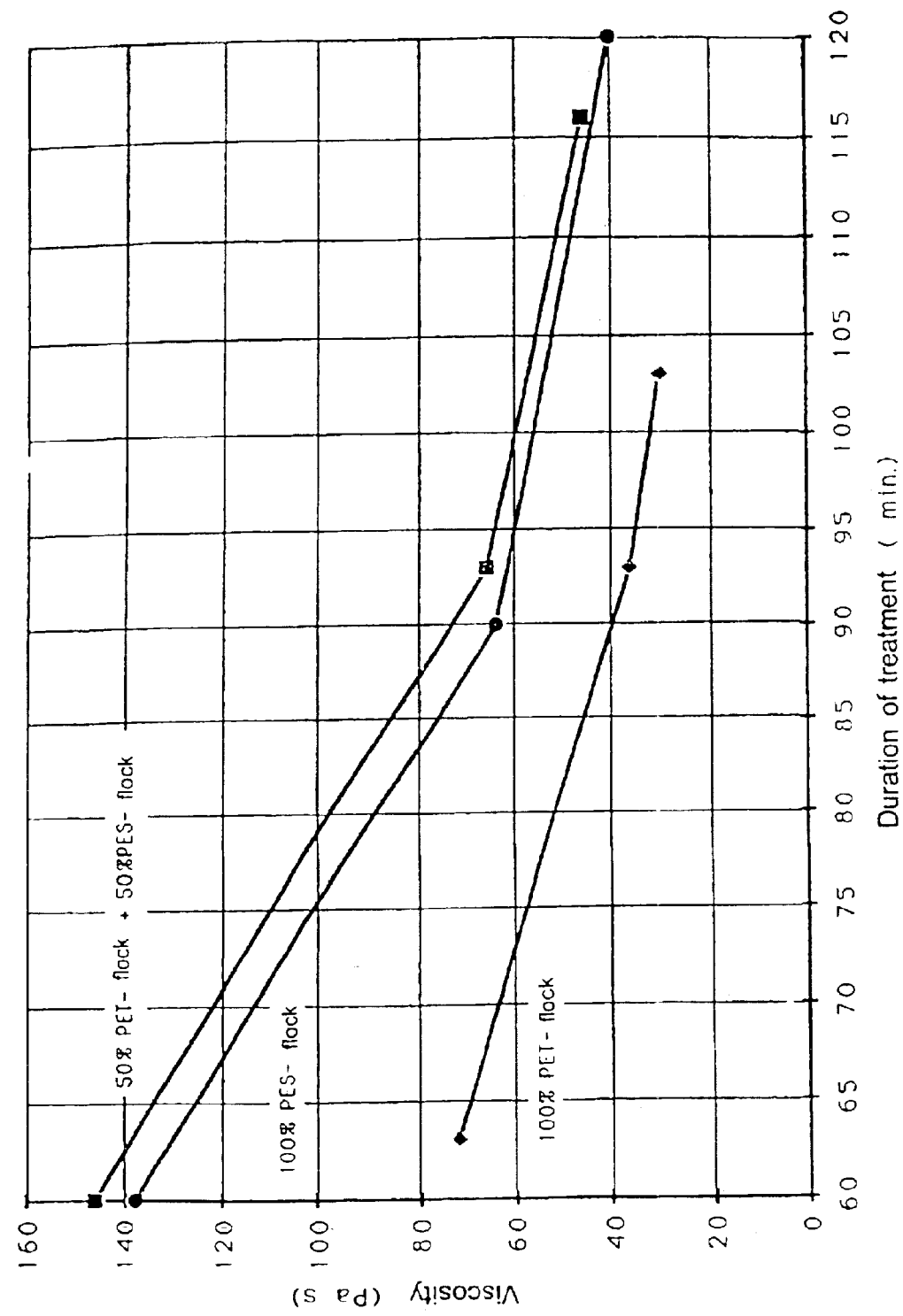

METHOD AND DEVICE FOR PRODUCING ELASTANE THREADS FROM RECYCLING MATERIAL

This invention relates to a process and a device for producing elastane fibres from spinning solutions by a dry or wet spinning process using elastane recycling material, which optionally can be supplemented by admixing fresh solutions of elastane material in any proportions.

BACKGROUND OF THE INVENTION

Elastane fibres are curtly produced mainly by two fundamentally different processes, the dry spinning process and the wet spinning process. In the dry spinning press, the spinning solvent of a polyurethane solution, typically in dimethylacetamide, is removed from the fibres spun in the spinning cabinet; the removal is effected by hot gas in the spinning cabinet and heating the spinning cabinet. In the wet spinning process for producing elastane fibres, the elastane solution to be spun is usually degassed, then prefiltered and transferred to a spinning tank. The polymer solution is subsequently filtered and, after optional further introduction of additives, the spinning solution is delivered to the spinnerets by means of metering pumps. This procedure is described, for example, by F. Founnée in Chemiefasern/Textilindustrie 44/96th Year, June 1994, page 365, or in U.S. Pat. No. 3,526,689.

By elastane solutions are meant solutions of polyurethanes or polyurethane ureas, which are conventionally made up of rigid and flexible segments, in suitable solvents such as dimethylacetamide or dimethylformamide. Usually polyester diols or polyether diols, depending on the intended use, are incorporated as flexible segments into the polyurethanes (polyurethane ureas).

Fresh spinning solutions, which are prepared by various solution processes, are generally used for producing elastane fibres. A practicable solution process is described, for example, in the document U.S. Pat. No. 3,428,711. Better solution processes have been disclosed by Offenlegungsschriflen DE 43 27 805 and DE 42 22 772 A1. Whereas, in the case of DE 43 27 805, one starts from a flow of liquid reaction materials, which are heated in a microwave cavity resonator in order to prepare an elastane solution, DE 42 22 772 describes a process for preparing elastane spinning solutions which have a stable viscosity and are low in gel by using a special multistep nozzle reactor. A diagram of the complicated preparation processes is reproduced in Chemiefasern/Textilindustrie 44/96th Year, June 1994, page 393, in FIG. 3.

Solution processes for elastane material in which the use of pure recycled material, i.e. for example, of already spun fibrous elastane material, are hitherto known only for a quite specific polymer composition.

According to the Canadian Patent CA 771086, spandex yams, which are produced if from metaxylylenediamine, a polyglycol and a diisocyanate, can be dissolved with a solvent, filtered and reprocessed to form elastane fibres by dry spinning through nozzles. For solution to be possible, the yams must have a linear polymer structure. In general, however, conventional elastane yams have cross-linked structures with a network in the form of biuret and allophanate bonding and consequently cannot easily be brought into solution In another known process, according to the Japanese Offenlegungsschrift JP 56122836, solid pieces of elastane are dissolved in isopropyl alcohol together with chloroacetaldehyde and a strong acid such as, for example, sulfuric acid and the solutions formed are further used for the production of synthetic leather. A use for elastane fibres is not described. The document DD 143916 describes the preparation of polyurethane-polyurea solutions by addition of recycled polyurethane solution during the chain extending reaction. Solutions of that kind, however, are suitable only for synthetic leather production and not for producing elastane fibres. Besides these methods of utilising materials, so-called material recycling, methods of reusing raw materials, so-called chemical recycling, are also known (cf. E. Weigand; Plastverarbeiter 1995 46 (2) pages 88–92). In chemical recycling, the polyurethane material is converted back into diamine and polyether polyol, for example, by hydrolysis with superheated steam under pressure. Other possible ways of converting polyurethanes are provided by hydrogenation, pyrolysis or high-temperature gasification.

The reason why hitherto no recycling process for normal elastane waste for example, from yarn production, has been found lies in the fact that in all solution processes it is necessary to apply high solution temperatures, usually above 100° C., in order to bring the elastane waste into solution. At these temperatures, however, the viscosity of the solution increases so much that no further processing can be carried out.

As in any elastane production process, waste arises in the form of residual fibres, for example, during disturbances in the course of production, during the spinning into other types and titres or as a result of defective batches, and as the raw materials price of the polymer material is high, as a rule more than 5.00 DM/kg polymer, the reuse of elastane waste is of great interest from the economic angle. The removal of fibrous waste (whether by dumping or by combustion) is likewise very cost-intensive, so that the provision of a process which renders possible the reprocessing of elastane waste is also very relevant from the environmental aspect.

SUMMARY OF THE INVENTION

The object is achieved by a process and a device for producing elastane fibres from spinning solutions by a dry or wet spinning process using elastane recycling material, which optionally can be carried out by admixing fresh elastane spinning solutions in any weight ratio, by adding secondary aliphatic amine, preferably diethyl amine, to the solutions.

DETAILED DESCRIPTION

The invention provides a process for producing elastane fibres by the dry spinning process or the wet spinning process using spinning solutions of elastane recycling material, optionally with the addition of fresh elastane solution, characterised in that a) the waste obtained from elastane material, in particular from elastane fibres, is cut up, in particular to a cut length of at least 0.1 mm, preferably to a cut length of at least 1 mm, particularly preferably to a cut length of 2 to 10 mm, most preferably to a cut length of 3 to 5 mm, b) the cut elastane material and 0.1 to 2 wt. %, based on the content of solid elastane, of a secondary aliphatic amine are introduced into the spinning solvent, c) the mixture of cut elastane material, spinning solvent and secondary aliphatic amine is heated at a temperature of 60° C. to 150° C., with homogenisation, d) the resulting homogeneous elastane spinning solution is prefiltered, e) optionally with the addition of fresh elastane solution, the elastane spinning solution is mixed at 70° C. to 140° C. with a fresh elastane solution, preferably having the same solids concentration, in any mixing ratio and heating is continued, f) the resulting spinning solution is cooled to a temperature of at not more than 70° C., preferably from 50° C. to 70° C., and filtered once more, g) the finished spinning solution is optionally remixed, for example, by stirring, degassed and subsequently spun into elastane fibres by the dry spinning process or the wet spinning process.

Preferably the elastane waste consists of both elastanes based on polyether and elastanes based on polyester, or of wastes of mixed polyether- and polyester-containing elastanes in any mixing ratio.

The secondary aliphatic amine used is in particular diethylamine (DEA), in a quantity preferably of 0.3 to 1 wt. %, in particular preferably of 0.5 to 0.8 wt. %, based on solid elastane.

The concentration of the finished spinning solution in step g) is from 22 to 45 wt. %, preferably from 30 to 40 wt. %.

Dimethylacetamide is preferably used as the spinning solvent.

In the case of a mixed spinning solution, the elastane spinning solution is mixed with a fresh elastane solution in step e) for a period of 5 to 60 minutes.

The total mixing time in steps b) and c) together is advantageously at least 10 minutes, preferably from 60 to 150 minutes, particularly preferably 90 to 120 minutes.

The solution temperature in step c) is advantageously from 80° C. to 120° C.

In the case where a mixture of waste elastane solution and fresh elastane solution is used, it is particularly advantageous to add the secondary amine, in particular diethylamine, to the fresh elastane solution not in step b) but in step f) and in the form of a stock batch of secondary amine and fresh elastane solution.

The recycling spinning solution and the fresh solution are preferably mixed together in a static mixer, preferably at 70° C. to 140° C., in particular at 100° C. to 120° C., for a period of 5 to 30 minutes and the spinning solution is subsequently cooled to 50° C. to 70° C.

The solids content of the recycling spinning solution in proportion to the solids concentration of the total spinning solution comprising recycling spinning solution and fresh elastane solution is preferably at least 10 wt. %, preferably at least 20 wt. %.

The spinning of the spinning solutions by the wet spinning process is carried out more effectively in particular from spinnerets having a nozzle hole diameter of 0.10 to 0.3 mm, preferably of 0.1 to 0.2 mm, The elastane material in step a) is introduced preferably in portions, in particular via a metering/weighing device, preferably at a rhythm of 1 to 10 kg/minute, particularly preferably 3 to 5 k/minute, into the vortex created by an agitated disperser in the previously prepared spinning solution.

The invention also provides elastane fibres obtained from the process according to the invention, in particular with a titre of up to 10,000 dtex, their fibre strength being 0.5 to 0.95 cN/dtex, preferably 0.7 to 0.9 cN/dtex, and their elongation at tear being 500 to 750%, preferably 550 to 700%.

The invention further provides a device for carying out the process according to the invention, consisting at least of a heatable mixing tank with an inlet for solid material, a mixer and a dispersing unit, of a mixing zone with static mixing elements, connected downstream of the mixing tank, of a cooling zone with mixing elements and of a filtering unit for subsequently filtering the prepared elastane spinning solution.

The dispersing unit consists in particular of at least one, particularly two, agitated dispersers.

The agitated dispersers are preferably equipped with screw-type segmented appliances.

The screw-type segmented appliances are selected in particular from suction cutters, webbed rings, kneading spirals and multiple current appliances.

The mixer in the mixing tank is preferably an anchor mixer and the mixing tank is provided with an additional cleaning device for the internal fittings of the mixer.

Surprisingly, it has been found that cutting up elastane bobbin material and wool from the spinning cabinets into short fibres of in particular approximately 3 to 5 mm cut length in a cutting mill with suitable tools causes no difficulties. These short fibres, which have a density of approximately 0.2 g/cm$^3$, can be conveyed flawlessly over spirals and screws without sticking and clogging, for example, from a silo into the mixing tank which is used for the preparation of the spinning solution.

Special mixing units are particularly helpful in the preparation of suitable spinning solutions from waste fibrous material. Experiments in a single-shaft agitated tank with various stirrer attachments showed that satisfactory results could not be obtained because of very long dissolving times and mixing times and very high specific driving powers owing to the high viscosity of the mixed material. It also became apparent that, in the agitated tank already containing spinning solvent (DMAC), with increasing addition of short elastane waste fibres the viscosity can be controlled and decreased only if secondary aliphatic amines such as, for example, diethylamine (DEA) are added to the spinning solution in the above-mentioned quantities of 0.5 wt. % DEA, based on solid elastane. Without the addition of secondary aliphatic amines, dissolving, mixing and heating lead to spinning solutions whose viscosity rapidly increased. Such spinning solutions can no longer be controlled technically. These spinning solutions are so highly viscous that they tend to gel and, owing to the high pressures required, they are also no longer conveyable. The required viscosity for the spinning process can then be adjusted, depending on the contact time, by heating, for example, the diethylamnine-containing spinning solutions to a temperature of up to 150° C. The adjustment of the viscosity of highly concentrated elastane solutions by reacting the solution with secondary aliphatic amines in order to produce spinning solutions for the dry or wet spinning of elastane fibres has already been described in DE 44 46 339. It is surprising that secondary amines can now also be used for the direct working up of elastane material.

As already mentioned above, single-shaft agitated tanks with various stirrer attachments, even with the application of secondary aliphatic amines to the spinning solvent, alone do not suffice to prepare suitable spinning solutions from waste elastane fibres. Time and again this leads to sticking to the edge of the agitated tank and to clogging inside the agitated tank. Stated in other words, inhomogeneous spinning solutions which cannot be spun flawlessly into fibres are obtained, despite the addition of amine.

Unexpectedly, it has been found that these problems can be solved if one starts with mixing tanks having specific properties in order to prepare the spinning solutions.

A most particularly suitable mixing and dispersing machine has proved to be a unit which is equipped with double mantle for heating and cooling and at least one, preferably two, mixing shafts with dissolvers as well as a mixing shaft with anchor mixer (cf. FIG. 1). The mixing shafts are advantageously fitted with screw-type segmented appliances such as, for example, suction cutters, webbed rings, kneading spirals or multiple current appliances. To prevent sticky deposits of polymer on the inside wall of the tank which is in contact with the product, the anchor mixer is preferably equipped with spring-mounted cleaning segments.

By means of such a mixing and dispersing machine, by initially using spinning solvent (in particular dimethylacetamide) and secondary aliphatic amine and by adding short waste fibres, it is possible successfully to prepare elastane spinning solutions having solids contents of up to 40 wt. % which can subsequently be spun flawlessly into elastane fibres having good fibre properties.

It has proved to be advantageous to add the waste fibres via a metering/weighing device at a constant timed rhythm, in order to achieve a homogeneous solution process.

Furthermore, it has been found that it is particularly beneficial to introduce the short waste fibres as far as possible in the vicinity of the liquid vortices caused by the mixing shafts, in order to achieve a good wetting and solution of the fibres.

The solution process described is suitable for preparing spinning solutions which can be spun into elastane fibres by both the dry and the wet spinning process. The required spinning viscosity, which is distinctly higher in the dry spinning process than in a wet spinning process, can be adjusted via the amine content, the temperature of the solution and the residence time in the heater (cf. FIGS. 2 and 3).

In addition to spinning solutions from pure recycling material, mixtures with freshly prepared elastane spinning solutions can also be prepared in any mixing ratio, as described above.

The nature of the spinning solutions, whether they are, for example, spinning solutions which are by dissolving polyester- or polyether-containing fibrous material, or mixtures thereof in any composition, is irrelevant here (cf. Table 1). In all cases elastane fibres having good fibre qualities can be produced from such spinning solutions.

The elastane waste material (for example, fibres or wool) can contain up to 15 wt. % of conventional agents for fibre preparation, in particular, mineral oils or oils based on polyalkylsiloxane, for example, polydimethylsiloxane PDMS and/or ethoxylated PDMS or metal salts of fatty acids (for example, Mg stearate) or hydrotalcites alone or in any mixture.

The process using mixtures of fresh solutions and recycling material is particularly suitable for a continuous operation. The use of pure recycling solutions is particularly appropriate for a batch operation.

Elastane spinning solutions having a solids content of Up to 40 wt. % can easily be prepared using the devices and solution processes described (cf. Example 11, Table 1).

Besides the preparation of the spinning solution, the quality of the spinning solution is also decisive in the recycling process according to the invention. Good qualities in the spinning solution lead to readily filterable spinning solutions without rapid build-up of pressure in the filtering units and to long nozzle lives and consequently to high product yields.

It has been found that the proposed solution process can be combined particularly advantageously with a wet spinning process with the use of spinnerets with nozzle hole diameters of 0.10 to 0.3 mm, in particular 0.1 to 0.2 mm, in order to achieve long nozzle lives. With finer nozzle hole diameters, for example, less than 0.10 mm, a considerably increased build-up of the pressure of the spinning solutions in front of the nozzle may possibly occur, which leads to distinctly shorter nozzle lives. Nozzle hole diameters of more than 0.3 mm have extremely low spraying speeds (less than 5) and possibly lead to very long delays in spinning (more than 50), which results in unstable spinning processes and broken fibres during fixing.

The spraying speed (S) is found from:

$$S = \frac{4 \cdot F(\text{m/min})}{Z \cdot d^2 \cdot \pi \cdot 100}$$

F=delivery (ccm/min)
Z=number of nozzle holes
d=nozzle hole diameter (cm)

The following Examples in association with FIGS. 1 to 3 serve to explain the invention further. All percentages given are based on the weight, unless indicated otherwise.

BRIEF DESCRIPTION OF THE DRAWINGS

FIG. 3 shows the decrease over time in the viscosity of different spinning solutions obtained from recycling material.

EXAMPLES

Figure 1:
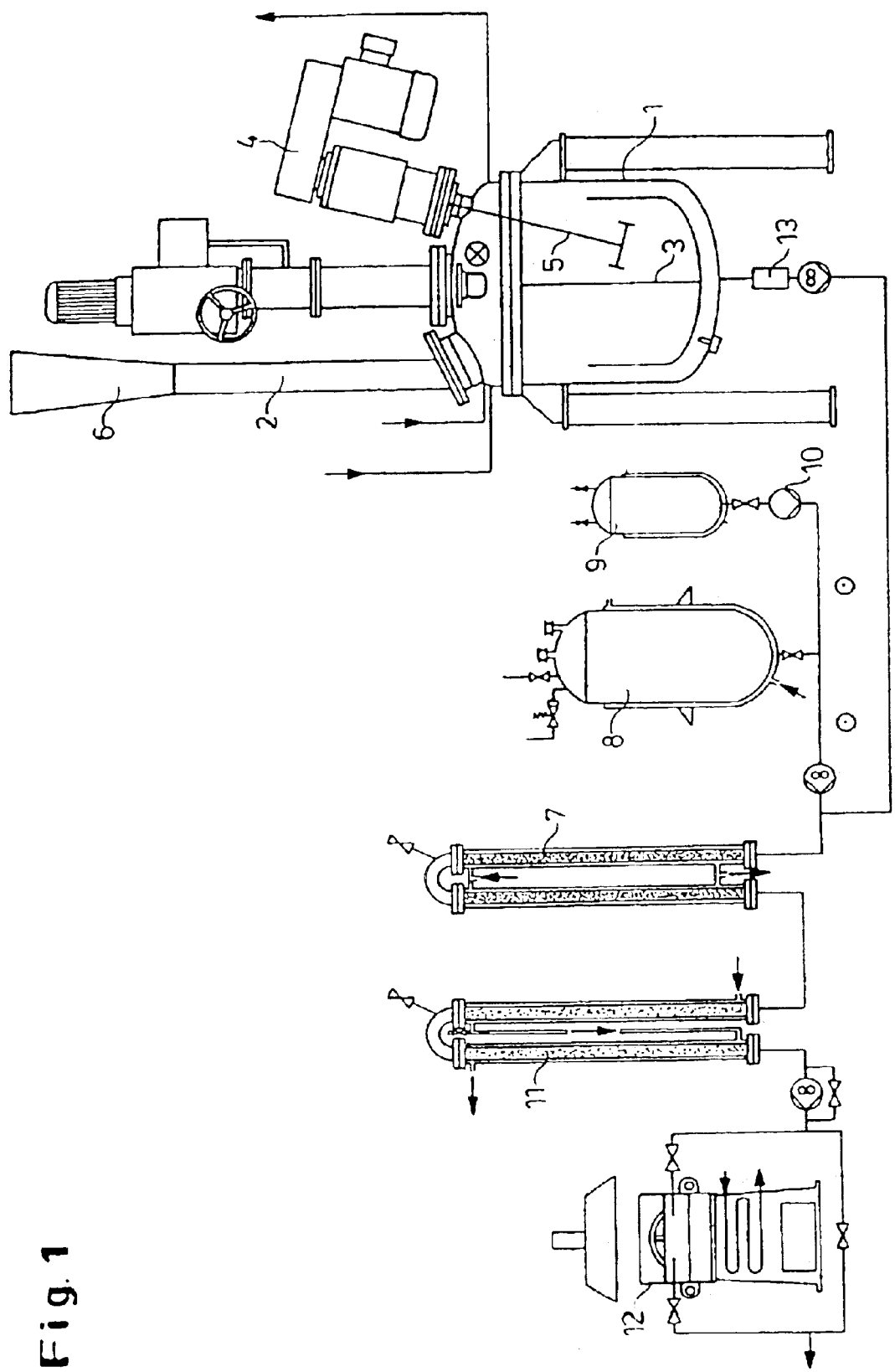
FIG. 1 shows the structure of a device for preparing the elastane solution from waste fibres.

Example 1 a) Preparation of a Spinning Solution from Recycling Material 280 kg dimethylacetamide (DMAC) and 600 g diethylamine (DEA) were introduced into a 600 liter mixing tank 1 (cf. FIG. 1) through an inlet 2. The two liquids were stirred and mixed together at room temperature by means of an anchor mixer 3. Then the dissolver 4 (dispersing unit), which was equipped with screw-type segmented appliances 5 comprising suction cutter, dissolver discs and kneading spiral, was put to into operation. The mantle heating of the mixing tank 1 was adjusted to 80° C. Subsequently, fibrous elastane material cut to lengths of 3 to 5 mm, originating from residual bobbins, was spirally conveyed alternately in portions at a rate of 4 kg/minute via a balance (not shown) through the filler neck 6 into the mixer tank 1. The fibrous elastane material consisted of 60 kg fibrous elastane material containing polyether (PET) as the component of the flexible segments and of 60 kg fibrous elastane material containing polyester (PES) as the component of the flexible segments, which were introduced alternately via a balance, as mentioned above. The solids concentration was 30 wt. % and the proportion of diethylamine (DEA) was 0.5 wt. %, based on solid elastane.

The addition of the cut fibrous elastane material in portions was effected in such a way that the material was introduced into the vortex created by the dissolver 4, 5. The dissolver 4, 5 was started at 700 revolutions per minute and after approximately 30 minutes, when the introduction of the fibres was complete, was operated at 1500 revolutions per minute for approximately 85 more minutes. The total stirring time was thus approximately 115 minutes.

In the course of this, the temperature of the mixture rose to approximately 110° C. as a result of the mixing energy produced. The viscosity of the resulting spinning solution, measured at 50° C., was 146 Pa.s after a stirring time of 60 minutes and 48 Pa.s at the end of the treatment period. The spinning solution was subsequently passed through a knot screen 13 and, together with the spinning solution b), was passed to a heated static mixer 7 (cf. FIG. 1).

b) Preparation of the Spinning Solution from Fresh Solution having Suitable Wet-Spinning Viscosity and Mixing with spinning Solution a)

A 30 wt. % elastane spinning solution, which had been prepared as in Example 2 of the document DE-A 42 22 772 and had a spinning viscosity of 138 Pa.s (measured at 50° C.), was placed in the agitated tank 8 (cf. FIG. 1). (The content of DFA 42 22 772 is hereby included with the present Application as a disclosure). In the side stem a diethylanine-containing stock batch from a second agitated tank 9 was added to the spinning solution via a gear pump 10 and subsequently this spinning solution, together with the spinning solution a), was delivered by a further gear pump in the ratio 1:1 through a heated static mixer 7, and mixed. The static mixer 7, which was lined with mixing elements, was heated to 120° C. The residence time in the mixer was approximately 15 minutes. In the side stream, DEA-containing stock batch was added in a quantity such that the spinning solution b), prior to mixing and prior to combination with the spinning solution a), had a DEA-content of 0.5 wt. %, based on elastane solid. The stock batch in the agitated tank 9 had been prepared from 20 kg of 30 wt. % elastane spinning solution, as described above, by adding 4,800 g diethylamine (DEA) at 40° C., with stirring for 30 minutes. The combined spinning solutions from a) and b), after they had been passed through and treated in the mixer 7, were then cooled to 70° C. in the second mixer 11, filtered through a filter press 12 and recirculated into a spinning tank with mixer (not shown). The combined elastane spinning solution, which consisted of 50% fresh solution (spinning solution b)), was visually homogeneous and contained neither large gel particles nor remains of undissolved fibrous material. The spinning viscosity of the solution, measured at 50° C., was 18 Pa.s.

c) Production of Elastane Fibres

The spinning solution from the spinning tank was passed directly to four 172-hole nozzles with 0.2 mm hole diameter, which were dipped into an aqueous spinning bath containing 22% DMAC. The filaments thus formed were drawn off at 80 m/min, coalesced, washed, fixed, prepared and wound up on a spooler at 125 m/min. The resulting fibres, with an individual titre of 751 dtex, had a fibre strength of 0.95 cN/dtex and an elongation at tear of 633%.

Figure 2:
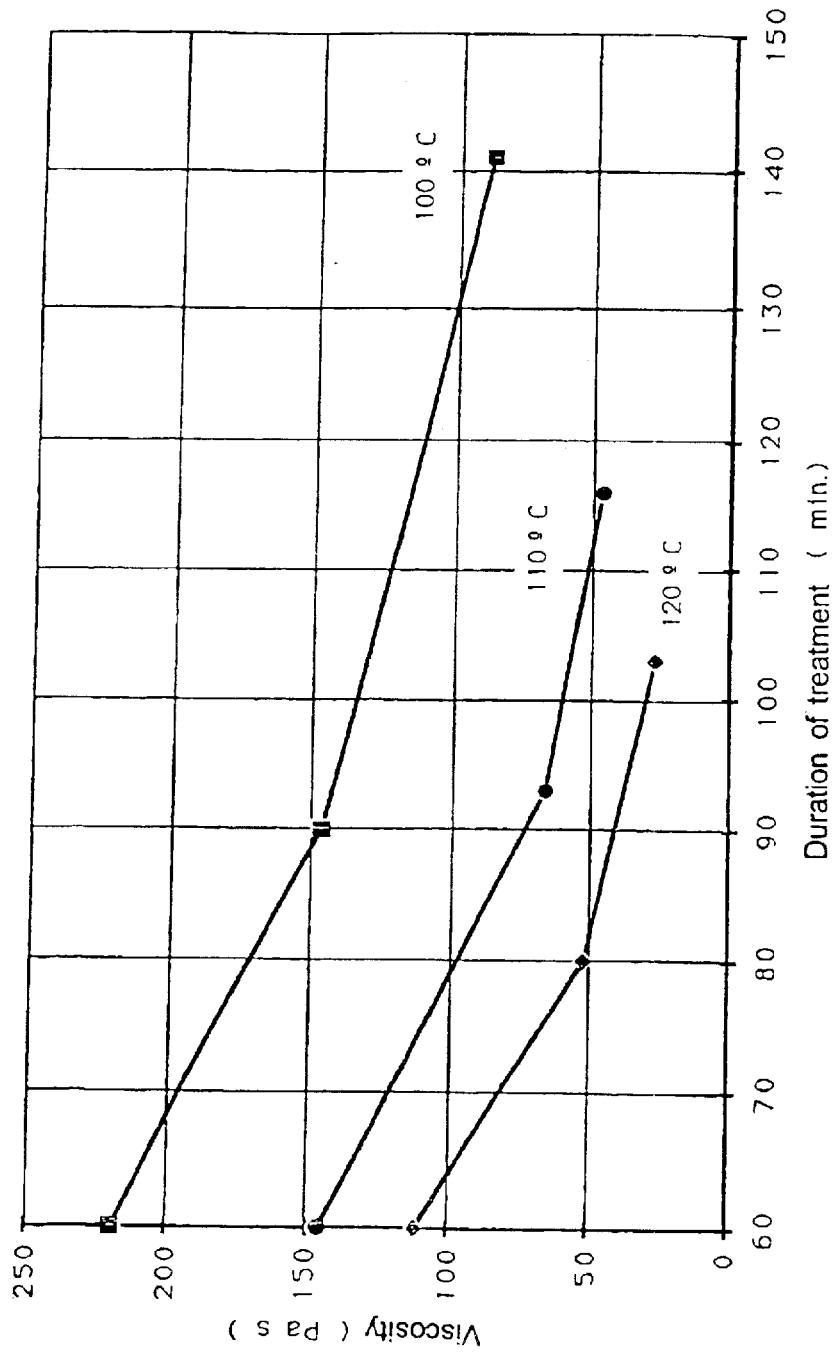
FIG. 2 shows the decrease over time in the viscosity of a spinning solution in Example 1 at different treatment temperatures.

FIG. 2 shows the decrease in the viscosity of the spinning solution having the composition described in Example 1 at three, different treatment temperatures in relation to the duration of treatment in the mixing tank 1 (cf. FIG. 1). As can be seen from the curves, the viscosity can be adjusted within a wide range. FIG. 3 shows the decrease in the viscosity of 30 wt. % spinning solutions obtained from recycling material of various compositions in relation to the duration of treatment. As the curves show, for the same duration of treatment in the mixing tank 1, under the same mixing conditions in the dissolver 4, 5 and at a mixing temperature of approximately 110° C., the spinning solution having the lowest viscosity is obtained from recycling spinning solutions containing pure fibrous elastane material based on polyether (PET) and the spinning solution having the highest viscosity is obtained from recycling spinning solutions consisting of fibrous elastane material containing polyether (PET) and polyester (PES) in the mixing ratio 1:1.

Example 2 a) Preparation of a Spinning Solution from Pure Recycling Material 280 kg DMAC and 600 g DEA were introduced into a 600 liter mixing tank 1 (cf. FIG. 1) through an inlet 2. The two liquids mixed together at room temperature by means of sting. Then the dissolver 4, which was equipped with screw-type segmented appliances 5, was started at 700 revolutions per minute. The mantle heating of the mixing tank 1 was adjusted to approximately 80° C. Subsequently, fibrous elastane material cut to lengths of 3 to 5 mm, originating from residual bobbins, was spirally conveyed in portions at a rate of 4 kg/minute via a balance through the filler neck 6 into the mixer tank 1. The fibrous elastane material consisted of 120 kg cut composite fibres containing polyether (PET) as the component of the flexible segments in the elastane. The solids concentration was again 30 wt. % and the proportion of DEA was 0.5 wt. %, based on solid. The cut composite fibres were again introduced into the vortex created by the dissolver 4. After approximately 30 minutes, when the introduction of the fibres was complete, the dissolver 4, was operated at 1500 revolutions per minute for a further 70 minutes. The total stirring time was thus approximately 100 minutes. In the course of this, the product temperature rose to approximately 110° C. as a result of the mixing energy produced. The viscosity of the spinning solution, measured at 50° C., was 72 Pa.s after a stirring time of 63 minutes and 30 Pa.s at the end of the treatment period (cf. FIG. 3). The spinning solution was subsequently passed through a knot screen 13 and then passed to a heated mixer 7. The static mixer 7, which was lined with mixing elements, was heated to 80° C. The residence time in the mixer 7 was approximately 10 minutes. The spinning solution in the mixer 11 was then cooled to 70° C., filtered through a filter press 12 and recirculated into a spinning tank (not shown). The spinning solution, which consisted of 100% recycling material, was visually again completely homogeneous and contained neither large gel particles nor remains of undissolved fibrous material. The spinning viscosity of the solution, measured at 50° C., was 20 Pa.s.

b) Production of Elastane Fibres

Subsequently the spinning solution from the spinning tank was in turn passed, as described in Example 1, directly to four 172-hole nozzles with a hole diameter of 0.25 mm instead of 0.2 mm, which dipped into an aqueous spinning bath containing 25% DMAC, then spun and aftertreated in the manner described in Example 1. The resulting elastane fibres had a titre of 822 dtex, a fibre strength of 0.79 cN/dtex and an elongation at tea of 626%.

Examples 3 to 12

Other compositions of recycling materials of varying chemical origin and fresh solutions of varying origin in different mixing ratios, corresponding to Examples 3 to 11, are listed in Table 1. There the abbreviation PES used indicates elastane spinning solutions containing a polyester component as the flexible segment, prepared as in Example 4 of DE 42 22 722 A1 and the abbreviation PET denotes elastane spinning solutions containing polyether material corresponding to Example 2 from DE 42 222 722 A1. All the spinning solutions were prepared as stated in Example No. 1 and spun into elastane fibres having a titre of 800 dtex. In the case of Examples 10 and 11, where more highly concentrated spinning solutions with a spinning concentration of 36 wt. % and 40.3 wt. % respectively were prepared, the concurrent heating in the mixing tank 1 was carried out at 110° C. instead of 80° C. The total stirring time was increased to 130 minutes and the dissolver 4 was operated at 1750 instead of 1500 revolutions per minute. The product temperature was approximately 133° C. and the viscosity of the spinning solutions at the end of the treatment time was 52 Pa.s and 46 Pa.s respectively. Finally, Example 12 is a Comparison Example which starts with a fresh pure solution of polyether. As can be seen from Table 1, both with 100% recycling spinning solution (cf. Example 3) and with all the mixing ratios, spinning of the solutions produced elastane fibres having a fibre strength of at least 0.72 cN/dtex and a fibre elongation at tear of at least 590%.

TABLE 1

Composition of the spinning solution

| Ex. No. | Fresh solution/ Type (%) | Recycling solution/ Type (%) | Spinning solution concn. (%) | Titre (dtex) | Strength (cN/dtex) | Elongation (%) |
| --- | --- | --- | --- | --- | --- | --- |
| 3 | — | 100/PES | 30 | 802 | 0.75 | 631 |
| 4 | 75/PES | 25/PET | 30 | 777 | 0.81 | 617 |
| 5 | 50/PES | 50/PET | 30 | 772 | 0.77 | 615 |
| 6 | 50/PET | 50/PET | 30 | 753 | 0.79 | 627 |
| 7 | 50/PET | 50/PES | 30 | 779 | 0.9 | 612 |
| 8 | 70/PET | 15/PET; 15/PES | 30 | 817 | 0.76 | 590 |
| 9 | 75/PET | 25/PES | 30 | 814 | 0.73 | 649 |
| 10 | 50/PET | 50/PET | 36 | 797 | 0.78 | 624 |
| 11 | 50/PET | 50/PET | 40.3 | 808 | 0.72 | 663 |
| 12 | 100/PET | Comparison | 30 | 774 | 0.92 | 584 |

What is claimed is:

1. Process for producing elastane fibers by the dry spinning process or the wet spinning press using spinning solutions of elastane recycling material, optionally with the addition of fresh elastane solution, wherein
   a) the waste obtained from elastane fibers, is cut up to a cut length of at least 0.1 mm,
   b) the cut elastane fibers and 0.1 to 2 wt. %. based on the content of solid elastane, of a secondary aliphatic amine are introduced into the spinning solvent,
   c) the mixture of cut elastane fibers, spinning solvent and secondary aliphatic amine is heated at a temperature of 60° C. to 150° C., with homogenization,
   d) the resulting homogeneous elastane spinning solution is prefiltered,
   e) optionally with the addition of fresh elastane solution, the elastane spinning solution is mixed at 70° C. to 140° C. with a fresh elastane solution, in any mixing ratio and heating is continued,
   f) the resulting spinning solution is cooled to a temperature of at not more than 70° C., and filtered once more,
   g) the finished spinning solution is optionally remixed, and subsequently spun into elastane fibers by the dry spinning process or the wet spinning process.

2. Process according to claim 1, wherein the elastane waste comprises both elastanes based on polyether and elastanes based on polyester, or wastes of mixed polyether- and polyester-containing elastanes in any mixing ratio.

3. Process according to claim 1 wherein the secondary aliphatic amine used is diethylamine (DEA), in a quantity of 0.3 to 1 wt. %, based on solid elastane.

4. Process according to claim 1, wherein the concentration of the finished spinning solution in step g) is from 22 to 45 wt. %.

5. Process according to claim 1, wherein dimethylacetamide is used as the spinning solvent.

6. Process according to claim 1, wherein the elastane spinning solution is mixed with a fresh elastane solution in step e) for a period of 5 to 60 minutes.

7. Process according to claim 1, wherein the total mixing time in steps b) and c) together is at least 10 minutes.

8. Process according to claim 1, wherein the solution temperature in step c) is from 80° C. to 120° C.

9. Process according to claim 1, wherein in the case where a mixture of waste elastane solution and fresh elastane solution is used, the required addition of secondary aliphatic amine to the fresh elastane solution is carried out not in step b) but in step f) and in the form of a stock batch of secondary aliphatic amine and fresh elastane solution.

10. Process according to claim 1, wherein the recycling spinning solution and the fresh solution are preferably mixed together in a static mixer, at 70° C. to 140° C. for a period of 5 to 30 minutes and the spinning solution is subsequently cooled to 50° C. to 70° C.

11. Process according to claim 1, wherein the solids content of the recycling spinning solution in proportion to the solids concentration of the total spinning solution comprising recycling spinning solution and fresh elastane solution is at least 10 wt. %.

12. Process according to claim 1, wherein the spinning of the spinning solutions by the wet spinning process is effected from spinnerets having a nozzle hole diameter of 0.10 to 0.3 mm.

13. Process according to claim 1, wherein the elastane fibers in step a) is introduced in portions into the vortex created by an agitated disperser in the previously prepared spinning solvent.

14. Device for carrying out the process of claim 1, comprising at least one heatable mixing tank with an inlet for solid material, a mixer and a dispersing unit, a mixing zone with static mixing elements, connected downstream of the mixing tank, a cooling zone with mixing elements and a filtering unit for subsequently filtering the prepared elastane spinning solution.

15. Device according to claim 14, wherein the dispersing unit consists of at least one agitated disperser.

16. Device according to claim 15, at least one agitated disperser is equipped with screw-type segmented appliances.

17. Device according to claim 15, wherein the at least one agitated disperser is equipped with screw-type segmented appliances selected from the group consisting of suction cutters, webbed rings, kneading spirals and multiple current appliances.

18. Device according to claim 14, wherein the mixer is an anchor mixer and the mixing tank is provided with an additional cleaning device for the internal fittings of the mixer.

19. The process of claim 1, wherein said cut length is at least 1 mm.

20. The process of claim 19, wherein said cut length is from 2 to 10 mm.

21. The process of claim of 20, wherein said cut length is 3 to 5 mm.

22. The process of claim of 1, wherein the cooling of step f) is to a temperature of 500° C. to 700° C.

23. The process of claim of 1, wherein the optional remixing of step g) is by stirring and degassing.

24. The process of claim of 3, wherein said quantity of diethylamine is 0.5 to 0.8 wt %.

25. The process of claim of 4, wherein said concentration is from 30 to 40 wt %.

26. The process of claim of 7, wherein said total mixing time is from 60 to 150 minutes.

27. The process of claim of 25, wherein said total mixing time is 90 to 120 minutes.

28. The process of claim of 9, wherein said secondary aliphatic amine is diethylamine.

29. The process of claim of 10, wherein said temperature is 100° C. to 120° C.

30. The process of claim 12, wherein said hole diameter is 0.1 to 0.2 mm.

31. The process of claim 13, wherein said elastane fibers is introduced via a metering or weighing device at a rate of 1 to 10 kg/minute.

32. The device of claim 15, wherein said dispersing unit consists of two agitated dispersers.

* * * * *